(12) United States Patent
Sunaga

(10) Patent No.: US 6,848,794 B2
(45) Date of Patent: Feb. 1, 2005

(54) REFLECTING OPTICAL ELEMENT, OPTICAL SYSTEM AND OPTICAL APPARATUS USING REFLECTING OPTICAL ELEMENT, PROJECTION TYPE IMAGE DISPLAY APPARATUS, AND METHOD FOR FABRICATING REFLECTING OPTICAL ELEMENT

(76) Inventor: Toshihiro Sunaga, 3-30-2, Shimomaruko, Ohta-ku, Tokyo (JP)

( * ) Notice: Subject to any disclaimer, the term of this patent is extended or adjusted under 35 U.S.C. 154(b) by 63 days.

(21) Appl. No.: 10/176,446

(22) Filed: Jun. 21, 2002

(65) Prior Publication Data

US 2003/0020886 A1 Jan. 30, 2003

(30) Foreign Application Priority Data

Jun. 26, 2001 (JP) .......................... 2001-193598

(51) Int. Cl.[7] .................. G03B 21/28; G03B 21/26; G03B 21/14; G02B 23/00; G02F 1/1335

(52) U.S. Cl. ................. 353/98; 353/30; 353/121; 353/122; 353/99; 353/78; 353/74; 349/5; 349/6; 359/364; 359/365; 359/599; 359/729; 359/857

(58) Field of Search ................. 353/30, 98, 99, 353/121, 122, 78, 74; 349/5, 6; 359/364, 365, 599, 729, 857

(56) References Cited

U.S. PATENT DOCUMENTS

| | | | |
|---|---|---|---|
| 4,755,217 A | 7/1988 | Chang et al. .................. 71/93 |
| 5,191,479 A | 3/1993 | Tsuchida ..................... 359/742 |
| 5,825,560 A | 10/1998 | Ogura et al. ................ 359/822 |
| 5,847,887 A | 12/1998 | Ogura et al. ................ 359/822 |
| 5,973,858 A | 10/1999 | Sekita ........................ 359/729 |
| 5,995,287 A | 11/1999 | Sekita ........................ 359/599 |
| 5,999,311 A | 12/1999 | Nanba et al. ............... 359/365 |
| 6,021,004 A | 2/2000 | Sekita et al. ................ 359/676 |
| 6,097,550 A | 8/2000 | Kimura ....................... 359/729 |
| 6,124,986 A | 9/2000 | Sekita et al. ................ 359/691 |
| 6,163,400 A | 12/2000 | Nanba ........................ 359/365 |

(List continued on next page.)

OTHER PUBLICATIONS

English language abstract of JP 2–297516.
English language abstract of JP 8–292371.
English language abstract of JP 8–292372.
English language abstract of JP 9–005650.
CRC Handbook of Chemistry and Physics, David R. Lide, 74th Edition, 1993–1994, Special Student Edition, CRC Press, Inc., copyright 1993. pp. 12–79 through 12–87, 12–134 and 12–135.*

(List continued on next page.)

Primary Examiner—Russell Adams
Assistant Examiner—Melissa J Koval

(57) ABSTRACT

A reflecting optical element is disclosed which includes the following articles.

The reflecting optical element is constituted by:
  a base member having a continuous curved-surface portion, and
  a resin layer integrally formed of resin on the curved surface of the base member, and having a plurality of mutually discontinuous curved surfaces to be reflecting surfaces. The base member is made of a material smaller in coefficient of linear expansion than the resin for forming the resin layer.

Thus, a reflecting optical element is provided which is low in optical-performance deterioration caused by the temperature effect, and small in the number of restraints in fabrication.

18 Claims, 6 Drawing Sheets

U.S. PATENT DOCUMENTS

| | | | | |
|---|---|---|---|---|
| 6,166,866 | A | 12/2000 | Kimura et al. | 359/729 |
| 6,181,470 | B1 | 1/2001 | Sekita | 359/364 |
| 6,215,596 | B1 | 4/2001 | Araki et al. | 359/631 |
| 6,268,963 | B1 | 7/2001 | Akiyama | 359/631 |
| 6,270,224 | B1 | 8/2001 | Sunaga et al. | 359/857 |
| 6,278,553 | B1 | 8/2001 | Akiyama | 359/627 |
| 6,292,309 | B1 | 9/2001 | Sekita et al. | 359/729 |
| 6,366,411 | B1 | 4/2002 | Kimura et al. | 359/729 |
| 6,513,935 | B2 * | 2/2003 | Ogawa | 353/37 |
| 6,616,287 | B2 | 9/2003 | Sekita et al. | 359/858 |
| 2001/0050758 | A1 * | 12/2001 | Suzuki et al. | 353/69 |

OTHER PUBLICATIONS

"Coefficient of Linear Expansion,"http://www.rowan.edu/colleges/las/physics and astronomy/LabManual/labs/Linear-Expansion.pdf. pp. 1 and 2.*

Coefficient of Themal Expansion (Linear), http://www.lib.umich.edu/dentlib/Dental.tables/Coefthermexp.html. pp. 1 through 3.*

CRC Handbook of Chemistry and Physics, David R. Lide, 74th Edition, 1993–1994, Special Student Edition, CRC Press, Inc., copyright 1993. pp. 12–79 through 12–87, 12–134 and 12–135.*

"Coefficient of Linear Expansion," http://www.rowan.edu/colleges/las/physics and astronomy/LabManual/labs/Linear-Expansion.pdf. Pages 1 and 2.*

Coefficient of Thermal Expansion (Linear), http://www.lib.umich.edu/dentlib/Dental.tables/Coefthermexp.html. pp. 1–3.*

* cited by examiner

REFLECTING OPTICAL ELEMENT, OPTICAL SYSTEM AND OPTICAL APPARATUS USING REFLECTING OPTICAL ELEMENT, PROJECTION TYPE IMAGE DISPLAY APPARATUS, AND METHOD FOR FABRICATING REFLECTING OPTICAL ELEMENT

BACKGROUND OF THE INVENTION

1. Field of the Invention

The present invention relates to a reflecting optical element constituting an optical system used in digital cameras, projectors, and copying machines, and the like, in particular, to a reflecting optical element which has a plurality of reflecting surfaces with a curvature.

2. Description of the Related Art

Various optical elements having reflecting surfaces with a curvature (reflecting optical elements) have been proposed, for example, in U.S. Pat. No. 4,755,217 and Japanese Patent Laid-Open No. 2-297516, where are disclosed or proposed optical prisms having reflecting surfaces with a curvature.

The optical prism disclosed in U.S. Pat. No. 4,755,217 is related to the eyepiece configuration in an observation optical system, which is arranged as illustrated in FIG. 8.

In this figure, a displaying light flux 215 incident on an optical prism 210 as a divergent light flux from an information display 211 is totally reflected at a plane 212 of the prism, then reflected on a concave surface 213 having a concave curvature, and incident as a nearly parallel flux light on the pupil 214 of an observer due to the effect of the concave surface 213.

In addition, the above-mentioned prism 210 is so arranged that it allows displayed-image observation as well as object-image recognition. In other words, the light flux 216 from an object is incident on an refracting surface 217 nearly parallel to the above-mentioned plane 212 to reach the concave surface 213. There is a semitransparent film or the like deposited on the concave surface 213, and the light flux 216 from the object, after passing through the concave surface 213, passes through the plane 212 and is incident on the pupil 214 of an observer. Thus, the observer can observe the overlapped images due to the light flux 216 from the object and the displaying light flux 215.

On the other hand, it is known that it is possible to construct an optical system in which aberration is sufficiently corrected by making an optical surface to be an asymmetrically, aspheric surface, on the basis of the concept of the reference axis introduced into a decentered optical system. For example, Japanese Patent Laid-Open No. 9-5650 discloses a relevant method of design, while Japanese Patent Laid-Open No. 8-292371 and Japanese Patent Laid-Open No. 8-292372 disclose relevantly designed examples.

Such a decentered system is referred to as an off-axial optical system. When the reference axis is assumed to lie along the beam of light passing through the image center and the pupil center, an off-axial optical system is defined as an optical system which includes such an off-axial surface that the normal to the optical surface, at the point of intersection of the optical surface and the reference axis, is not on the reference axis. In an off-axial system the reference axis takes a bent shape.

In such an off-axial optical system, the optical surface becomes decentered, and the eclipse does not occur even on a reflecting surface, and hence it is easy to construct an optical system utilizing a reflecting surface. In addition, an off-axial optical system is characterized by the facts that there is a relatively high freedom in optical path routing and that construction of an integral optical system is easy to make on the basis of an integral-forming technique for forming an optical surface, and the like.

Accordingly, it is possible to construct a reflecting optical element which is excellent in space efficiency, compact and latitudinous in shape.

As for the above-described kind of reflecting optical elements, recently the mold fabrication using a metal mold prevails to meet a demand for lower cost. Mainly, these elements are formed of such resin materials as polystyrene, polymethyl methacrylate, polycarbonate, and the like.

In these resin-made elements, however, optical-performance deterioration is caused by the temperature variation, since there are fairly large differences in thermal expansion coefficient between the resin and inorganic materials.

When there are used such materials small in thermal expansion coefficient as glass, metal, and the like, the optical performance deterioration due to temperature variation does not cause serious problems, whereas there are many restraints in fabrication. For example, when glass is used, a smooth shape as a whole having neither steps or edges is required to be formed, since the presence of either steps or edges causes cracking formation therefrom.

In order to prevent these inconveniences, Japanese Patent Laid-Open No. 8-122505 has made an attempt to eliminate the cracking formation occurring at the time of fabrication, by smoothly joining the two surfaces abutting along the boundary through an appropriate configuration of the joint-surface shapes of the joint portions, when an optical member (a reflecting surface) is fabricated integrally from a plurality of optical members (reflecting surfaces).

Generally, there is no guarantee that all optical members can be joined so smoothly. Since a design permitting such smooth joining of optical members is necessarily accompanied by increasing restraints in fabrication, a desired optical performance is not easily achieved.

SUMMARY OF THE INVENTION

The object of the present invention is to prevent deterioration in optical performance in a reflecting optical element having a plurality of reflecting curved surfaces caused by the temperature variation, and to relax the restraints in fabrication of such an element.

In order to achieve the object, in the present invention, a resin layer having a plurality of mutually discontinuous curved surfaces on its surface, which curved surfaces are respectively operative as reflecting surfaces, is formed integrally on the curved surface portion provided on a base member, while the base member is made of a material smaller in coefficient of linear expansion than the resin for forming the resin layer.

In this connection, the resin layer can be formed of either thermosetting resin or ultraviolet curable resin, while the base member can be formed of glass, metal, ceramic, and the like.

A detailed configuration of the reflecting optical element, optical system and optical apparatus using reflecting optical element, and method for fabricating reflecting optical element of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
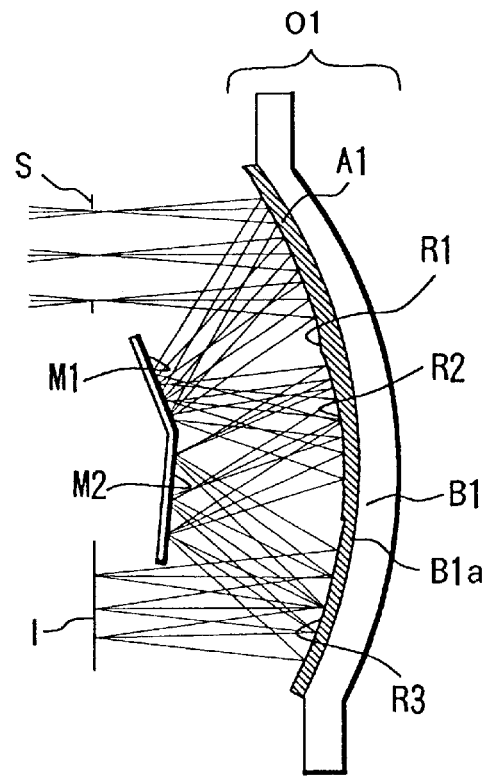
FIG. 1 is an optical path diagram for an optical system which uses a reflecting optical element of an embodiment of the present invention.
Figure 2:
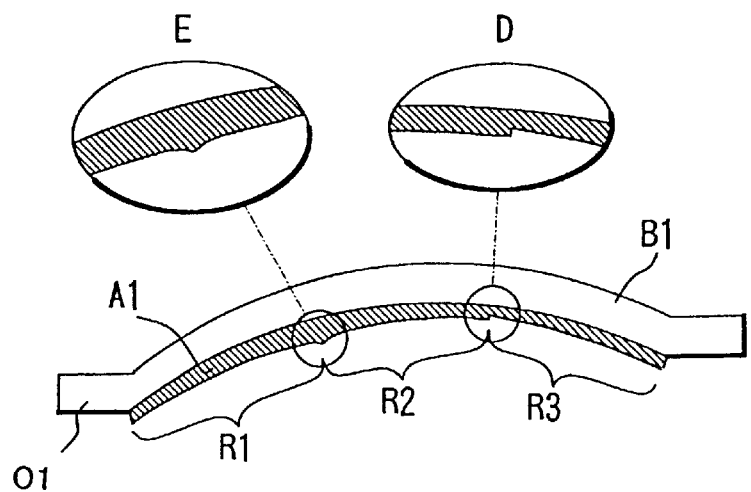
FIG. 2 is a schematic view illustrating the arrangement of the reflecting optical element shown in FIG. 1.

FIG. 1 shows the optical path diagram of an optical system which uses the reflecting optical element in an embodiment of the present invention, and FIG. 2 shows the reflecting optical element O1.

The optical system composes an aperture-stop S, two plane mirrors M1 and M2, an image pickup device I comprising CCD, CMOS, or the like, and the above-mentioned reflecting optical element O1.

The reflecting optical element O1 composes a base member B1 made of such a material as glass, metal, ceramic, or the like, smaller in coefficient of linear expansion than commonly used resins, and a resin layer A1 formed on the smoothly continuous curved portion B1a which is fabricated on the base member B1.

Curved-surface-shaped reflecting surfaces R1, R2, and R3, which are mutually discontinuous and have respectively different curvatures, are formed on the surface of the resin layer A1. In such a way, the curvature of each reflecting surface can be set without restriction, and hence a desired optical performance can be easily obtained.

In the optical system, as FIG. 1 shows, the light flux from an object, not shown in the figure, passes through the aperture-stop S, is reflected on the reflecting surface R1 of the reflecting optical element O1, is incident on the upper plane mirror M1, and reflected thereon, and furthermore, subsequently is reflected successively in order by the reflecting surface R2, the lower plane mirror M2, and the reflecting surface R3, and forms an image on the image pickup device I. In this manner, an image-taking optical system can be constructed which can secure a long optical path despite of its compact size, and it is made possible to provide a compact image-taking apparatus (optical apparatus) equipped with this image-taking optical system.

As shown in FIG. 2, an edge E is formed on the boundary between the reflecting surfaces R1 and R2 of the reflecting optical element O1, while an step D is formed on the boundary between the reflecting surfaces R2 and R3.

If these reflecting surfaces are formed of glass, there is an apprehension that the cracking formation and the like will occur on the respective boundaries.

If the whole reflecting optical element is formed of a resin material, such problems are not expected to occur, but the thermal (due to the temperature variation) deterioration of the optical performance is aggravated, since the coefficient of linear expansion of a resin materials is larger as compared with glass.

On the contrary, in the reflecting optical element O1 in the embodiment, the resin material used for the base member B1 is smaller in coefficient of linear expansion than that used for forming the resin layer A1 formation, and hence the thermal effect is reduced as compared with the case of forming the whole reflecting optical element by use of resin. In addition, the reflecting-surface forming portion (the resin layer A1) is made of a resin material, and hence such troubles as the cracking formation and the like do not occur, even when edges and steps are formed.

In addition, the base member B1 is formed in such a smooth shape that as a whole it has no steps and edges, and hence such troubles as the cracking formation and the like do not occur, even with-the use of such materials as glass and the like which are more difficult in molding as compared with resin.

By the way, if the three reflecting surfaces R1 to R3 are separately formed, even the use of glass as their material does not lead to the trouble of cracking formation, but a high-precision technique for assembling these reflecting surfaces is required.

On the contrary, as for the reflecting optical element O1 of the present embodiment, a plurality of reflecting surfaces are formed integrally on the surface of the single base member B1, through which the positioning precision for the plurality of the reflecting surfaces R1 to R3 can be enhanced, and the numbers of parts and fabrication processes can be reduced.

Furthermore, in the reflecting optical element O1 of the present embodiment, the interior portions of the base member B1 and resin layer A1 do not assume any optical operations, and hence it is not necessarily required to use transparent bodies for the base member B1 and resin layer A1. In the case where an ultraviolet curable resin is used for the resin layer A1, however, preferably a transparent body is used for the base member B1, since the ultraviolet light for curing the resin is generally incident from the back surface of the base member B1.

Furthermore, since the interior portions of the base member B1 and resin layer A1 do not assume any optical operations, there is no such a restriction as the matching of the refractive indexes of the two, so that the degree of freedom is high in selecting the materials thereof.

The method for fabricating the reflecting optical element O1 will be briefly described below by referring to FIG. 3 and FIG. 4, where the metal mold unit CU is partitioned into the constituent metal molds C1 to C3 which are respectively allotted to the reflecting surfaces R1 to R3 so as to be used for forming these reflecting surfaces.

Figure 3:
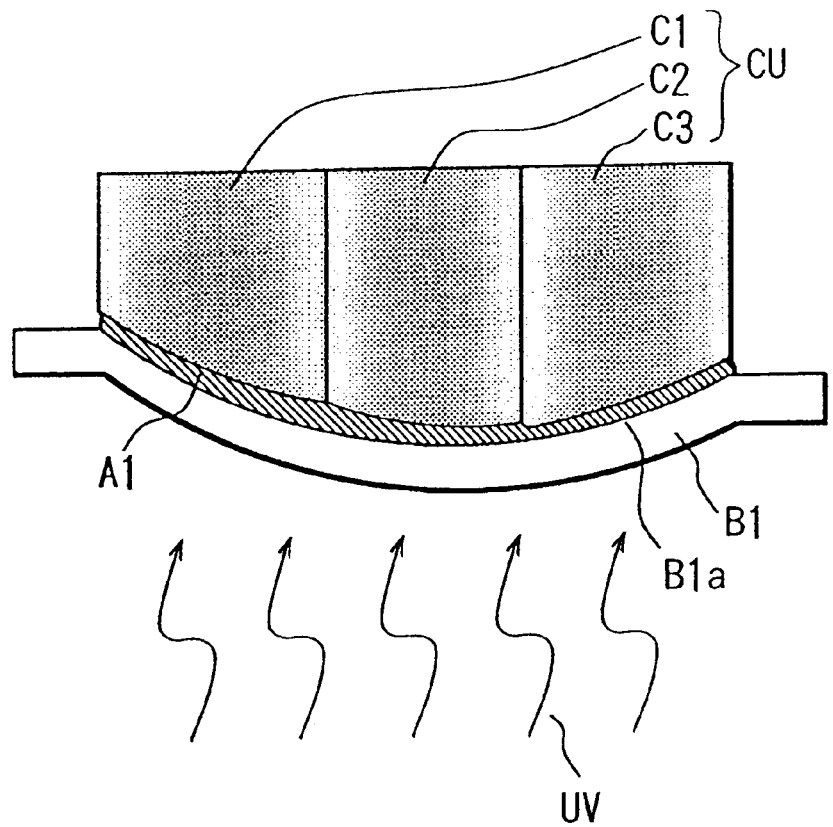
FIG. 3 is a schematic view illustrating the method for fabricating the reflecting optical element in FIG. 1.

As is shown in FIG. 3, the ultraviolet curable resin monomer material to form the resin layer A1 is laminated between the smooth curved surface B1a of the base member B1 and the metal mold unit CU, and subsequently the ultraviolet curable resin is irradiated with ultraviolet light UV from the back surface of the base member B1 to cure the ultraviolet curable resin.

Thereafter, the metal mold unit CU is detached from the resin layer to obtain a reflecting optical element which is provided on the base member B1 with the resin layer A1 having the shapes of the reflecting surfaces R1 to R3 (a fabrication method based on the so-called replica method).

Figure 4:
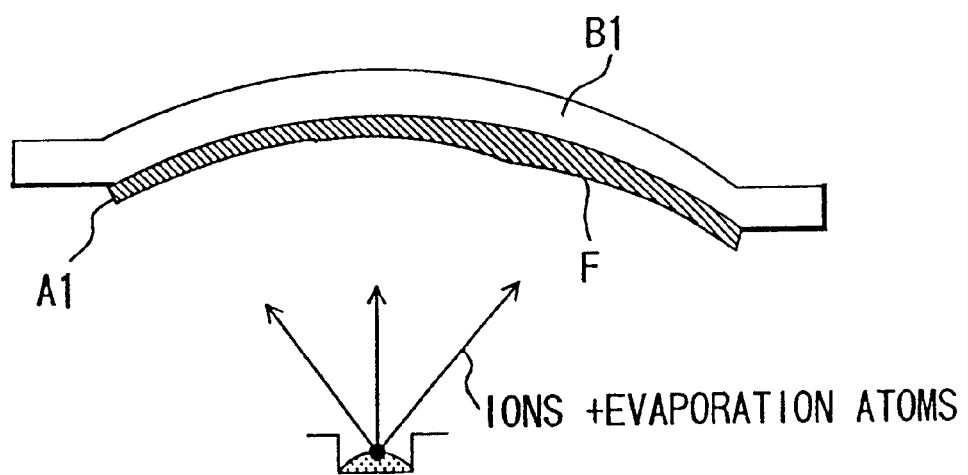
FIG. 4 is a schematic view illustrating the method for fabricating the reflecting optical element in FIG. 1.

Furthermore, as shown in FIG. 4, the reflecting film F is formed on the surface of the resin layer A1, which surface is to be provided with the reflecting surfaces R1 to R3, by means of the ion-beam assist method (hereafter abbreviated as IAD) and the like. IAD is a method which deposits evaporation atoms by using ion beam and is capable of forming film at low temperatures. Thus, a reflecting optical element provided with a desired optical performance can be obtained.

Incidentally, the film forming method for the reflecting film F is not restricted to IAD, but may be selected from such other methods as vapor deposition, sputtering, dipping, and the like.

In the present embodiment, description is made on a reflecting optical element having three reflecting surfaces, but the number of the reflecting surfaces is not restricted to this number. All the curvatures of the reflecting surfaces are not required to be different from each other, that is, the curvatures of some of the reflecting surfaces may be the same.

While in the present embodiment, description is made on the case of forming the resin layer with ultraviolet curable resin, thermosetting resin may also be used.

While in the present embodiment, description is made on the optical system constructed with the reflecting optical element in combination with the plane mirrors M1 and M2, an optical system may also be constructed with a combination of the plurality of the reflecting optical elements of the present embodiment.

Figure 5:
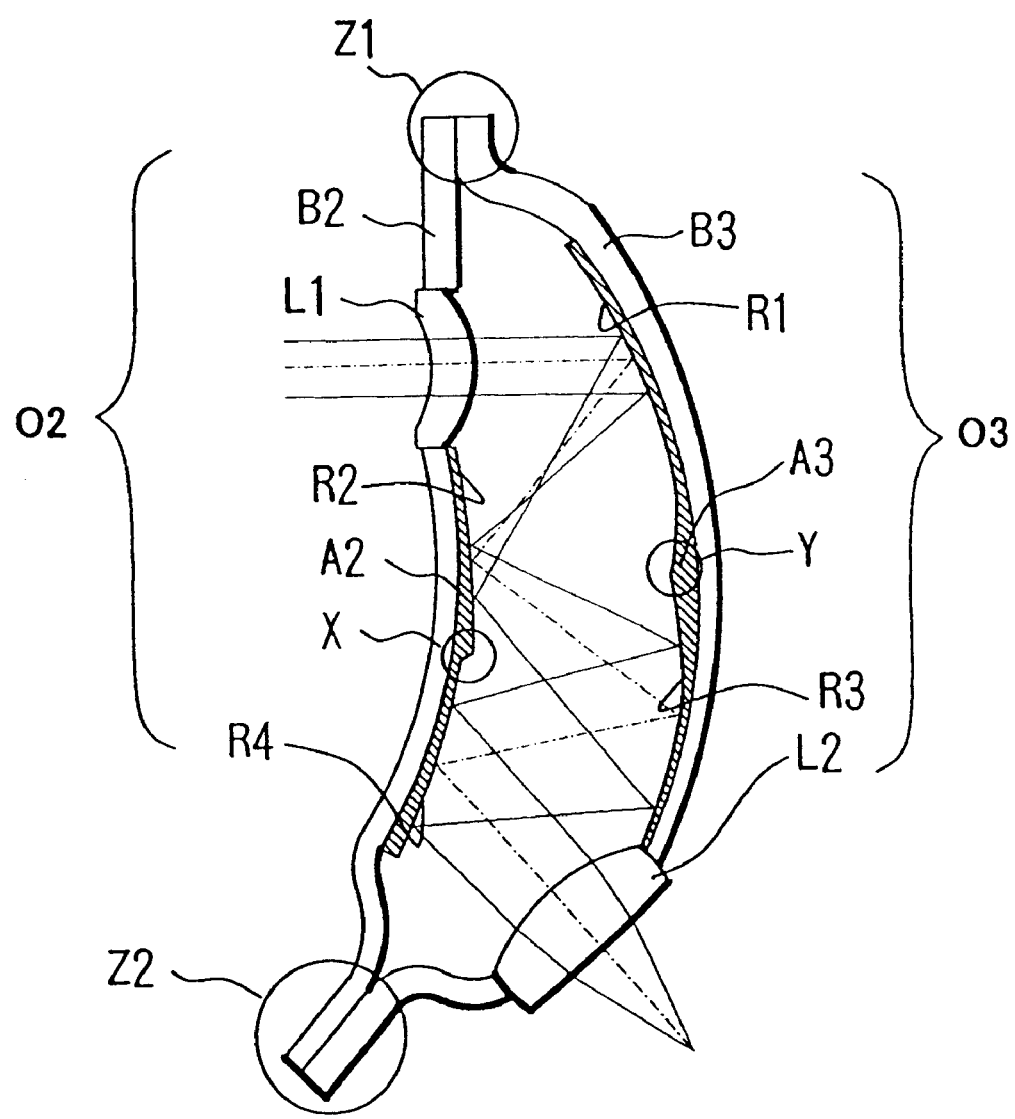
FIG. 5 is an optical path diagram for an optical system which uses the reflecting optical element of another embodiment of the present invention.

FIG. 5 shows an arrangement of an optical system which uses a reflecting optical element of another embodiment of the present invention.

The optical system of the present embodiment is constructed by combining reflecting optical elements O2 and O3, fabricated similarly to the above-described embodiment, with their reflecting surfaces facing to each other.

The reflecting optical element O2 comprises a base member B2, a resin layer A2 formed on the smooth and continuous curved surface portion of the base member B2, and a lens L1 held at a portion other than the curved surface portion (the portion which the resin layer A2 is formed on) of the base member B2. Reflecting surfaces R2 and R4 having predetermined curved surface shapes are formed on the surface of the resin layer A2.

Similarly, the reflecting optical element O3 comprises a base member B3, a resin layer A3 formed on the smooth curved surface portion of the base member B3, and a lens L2 held at a portion other than the curved-surface portion (the portion which the formed resin layer A3 is formed on) of the base member B3. Reflecting surfaces R1 and R3 having predetermined curved surface shapes are formed on the surface of the resin layer A3.

Both reflecting optical elements O2 and O3 are provided with the hole parts to hold the lenses L1 and L2 respectively, and are also joined to each other at the upper and lower junctions Z1 and Z2.

In the optical system of the present embodiment, the light flux from an object, not shown in the figure, passes through an aperture-stop, not shown in the figure, passes through the lens L1, is successively in order reflected on the reflecting surfaces R1 to R4, passes through the lens L2 and forms an image. Similarly to the above-mentioned embodiment, either an image pickup device or the pupil of an observer observing the object may be arranged on the imaging plane.

In this manner, an image-taking optical system (image-taking apparatus) and an observation optical system (observation apparatus, optical apparatus) can be provided which can secure a long optical path despite of its compact size.

Incidentally, as FIG. 5 shows, a step is formed on the portion X constituting the boundary between the reflecting surfaces R2 and R4, and an edge is formed on the portion Y constituting the boundary between the reflecting surfaces R1 and R3.

The use of such stiff materials as glass and the like would lead to the troubles of cracking formation and the like in the portions X and Y, but in the present embodiment, similarly to the above-mentioned embodiment, the reflecting surfaces are formed of resin materials (the resin layers A2 and A3), and hence the troubles of cracking formation and the like do not occur even when edges and steps are formed.

The deterioration in optical performance caused by the thermal (temperature) effect is also alleviated by using, as the materials for the base members B2 and B3, such materials as glass, metal, ceramic, and the like smaller in coefficient of linear expansion than the resins for forming the resin layers A2 and A3.

Since in each of the two reflecting optical elements O2 and O3, a plurality of reflecting surfaces are formed integrally on the surface of a single base member, the positioning precision of the plurality of the reflecting surfaces is high and the numbers of parts and fabrication processes can be reduced.

Since as for the reflecting optical elements O2 and O3, reflection is operative only on the surfaces, it is not necessarily required to use transparent bodies for the base member and resin layer, and there is also no such restrictions as the matching of the refractive indexes of the base member and resin layer, so that the degree of freedom is high in selecting the materials thereof.

In the present embodiment, hole parts are provided in the portions of the base members B2 and B3 other than the portions which the resin layers are formed on, which holes are used to hold the lenses L1 and L2, so that the refractive members (lenses) can be held with high precision to the respective reflecting surfaces, also resulting in reduction of the number of parts.

In the present embodiment, description is made on the cases in each of which two reflecting surfaces are formed on the surface of a reflecting optical element, but the number of the reflecting surfaces is not restricted to two.

In addition, in the present embodiment, description is made on the cases in each of which two reflecting optical elements are combined, but more than two reflecting optical elements may be combined. The number of the lenses held to the base member is also optional.

Figure 6:
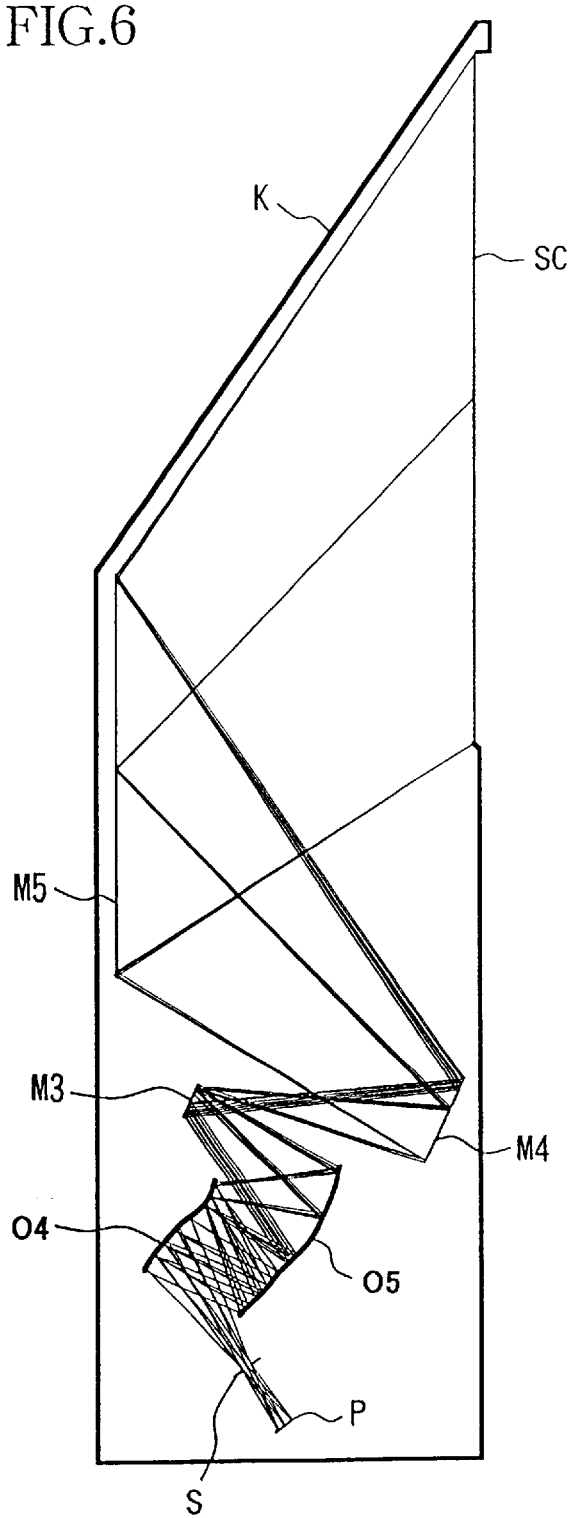
FIG. 6 is a schematic block diagram of a projection optical system of a back-projection projector which uses the reflecting optical element of still another embodiment of the present invention.
Figure 7:
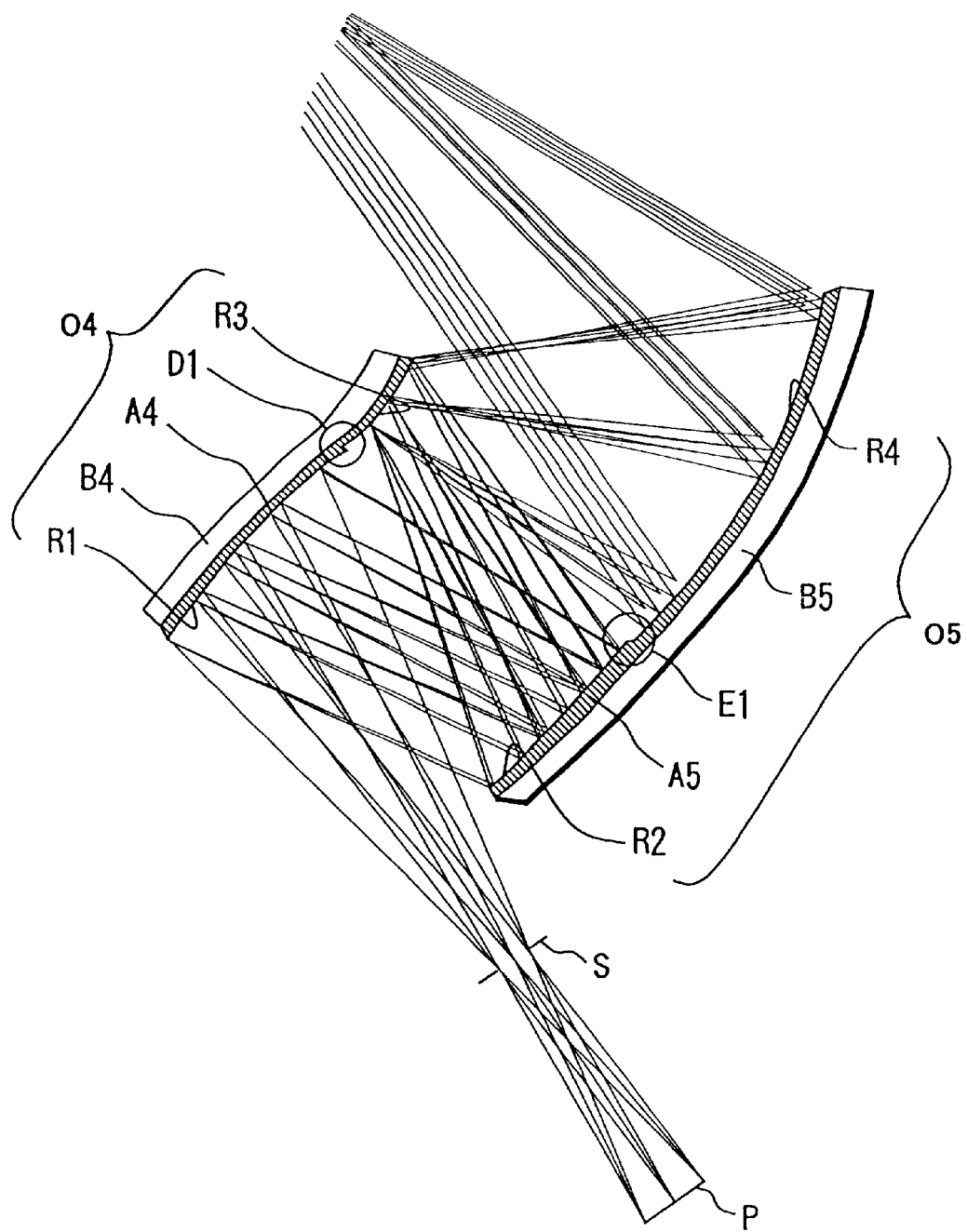
FIG. 7 is a block diagram of the reflecting optical element shown in FIG. 6.
Figure 8:
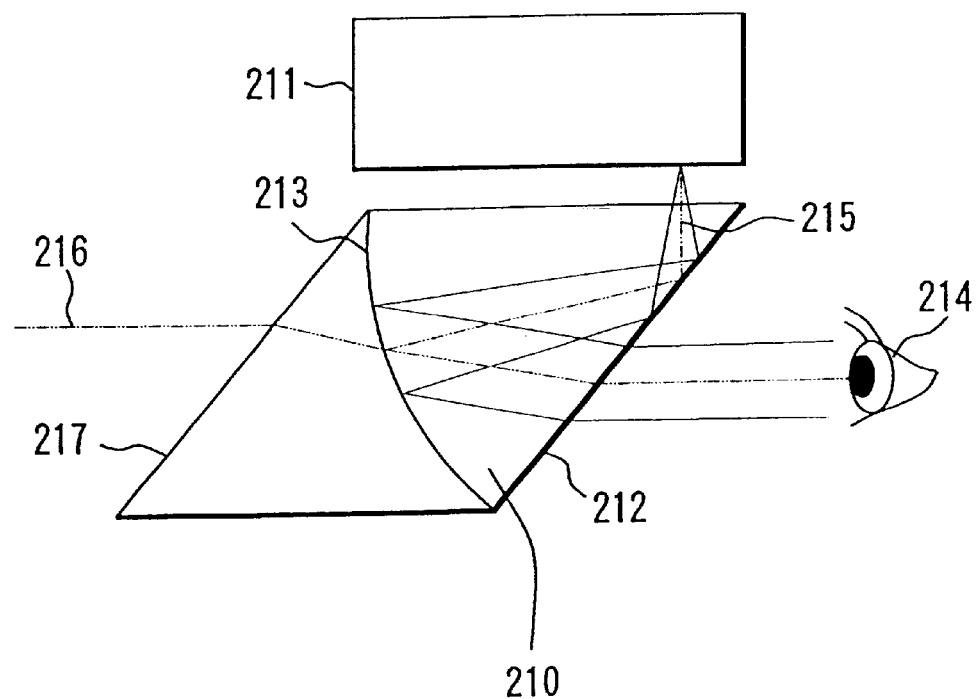
FIG. 8 is a schematic view illustrating a prior-art observation optical system having a curvature in the reflecting surface.

FIG. 6 and FIG. 7 illustrate the case where the reflecting optical element of still another embodiment of the present invention is applied to a projection optical system of a rear-projection type projector (optical apparatus).

FIG. 6 is a schematic block diagram of the projection optical system of a rear-projection type projector. In FIG. 6, K is a projector body (chassis), P is a display device such as an LCD displaying the original image and the like, S is an aperture-stop, O4 and O5 are reflecting optical elements constructed in a manner similar to the above-described embodiments, M3, M4, and M5 are plane mirrors, and SC is a screen.

The image-carrying light emitted from the display device P is regulated by the aperture-stop S, subsequently incident on the reflecting optical elements O4 and O5 as a projection optical system, reflected successively on the respective reflecting surfaces belonging to the respective reflecting optical elements O4 and O5, further reflected successively by the plane mirrors M3, M4, and M5, and undergoes magnified projection onto the screen SC.

By referring to FIG. 7, the reflecting optical elements O4 and O5 are described in more detail. The reflecting optical element O4 is provided with a resin layer A4 formed on a base member B4 made of glass, metal, ceramic, or the like, which resin layer A4 has on its surface the reflecting surfaces R1 and R3, having mutually discontinuous curved-surface shapes. The reflecting optical element O5 is provided with a resin layer A5 formed on a base member B5 made of glass, metal, ceramic, or the like, which resin layer A5 has on its surface the reflecting surfaces R2 and R4, having mutually discontinuous curved-surface shapes.

As can be seen from FIG. 7, the image-carrying light emitted from the display device P passes through the aperture-stop S, and is reflected in order on the reflecting surface R1, reflecting surface R2, reflecting surface R3, and reflecting surface R4. The image-carrying light incident on the reflecting surface R1 is optically affected by these reflecting surfaces R1 to R4, which are either concave or convex, to be launched to the plane mirror M3.

There is a step D1 on the boundary between the concave reflecting surface R1 and the convex reflecting surface R3, while there is an edge E1 on the boundary between the concave reflecting surface R2 and the concave reflecting surface R4 different in curvature from the reflecting surface R2. In these reflecting optical elements O4 and O5. However, the surface shapes are formed using resin materials, and accordingly there is little apprehension that the resin layers A4 and A5 undergo defective formation, cracking formation, and the like.

Since the materials such as metal any glass, used for the base members B4 and B5 are smaller in coefficient of linear expansion than those used for the resin layers A4 and A5, the optical-performance variation caused by the environmental variations, such as the temperature variation and the like, is also suppressed, As provided in the present embodiment, by using the reflecting optical elements O4 and O5 as the projection optical system in a projector, there can be provided a thin rear-projection type projector which is relatively easy in fabrication and low in the optical-performance deterioration caused by the environmental variations.

As illustrated above, according to the above mentioned embodiments, on the continuous curved surface of the base member, there is provided a resin layer in which a plurality of discontinuous curved surfaces constituting surface-reflecting surfaces are formed integrally, and the base member is made of a material smaller in coefficient of linear expansion than the resin for forming the resin layer, thus making it possible to provide a reflecting optical element low in the optical-performance deterioration caused by the temperature variation and small in the number of restrictions in fabrication.

In addition, the integral molding of the resin layer having a plurality of reflecting surfaces enhances the positioning precisions of the respective reflecting surfaces, and hence the numbers of parts and fabrication processes can be reduced.

Since the curvatures of the plurality of the curved surfaces on the resin layer can be specified without restriction, a desired optical performance can be easily obtained.

While preferred embodiments have been described, it is to be understood that modification and variation of the present invention may be made without departing from the sprit or scope of the following claims.

What is claimed is:

1. A reflecting optical element comprising:
   a base member having a continuous curved-surface portion; and
   a resin layer integrally formed of resin on the curved surface of said base member, and having a plurality of mutually discontinuous curved surfaces to be reflecting surfaces,
   wherein said base member is made of a material smaller in coefficient of linear expansion than the resin for forming said resin layer.

2. The reflecting optical element according to claim 1, wherein at least one of said plurality of the curved surfaces on said resin layer is different in curvature from the other curved surfaces.

3. The reflecting optical element according to claim 1, wherein the curvatures of said plurality of the curved surfaces on said resin layer are different from each other.

4. The reflecting optical element according to claim 1, wherein said base member is formed of glass.

5. The reflecting optical element according to claim 1, wherein said base member is formed of metal.

6. The reflecting optical element according to claim 1, wherein said base member is formed of ceramic.

7. The reflecting optical element according to claim 1, wherein said resin layer is formed of thermosetting resin.

8. The reflecting optical element according to claim 1, wherein said resin layer is formed of ultraviolet curable resin.

9. The reflecting optical element according to claim 1, wherein reflecting films are formed on said plurality of the curved surfaces on said resin layer.

10. The reflecting optical element according to claim 1, wherein said reflecting films are formed by means of any one of the ion beam assist, evaporation, sputtering, and dipping methods.

11. The reflecting optical element according to claim 1, wherein a refractive optical member is held in a portion of said base member other than said curved-surface portion thereof.

12. An optical system comprising a reflecting optical element according to claim 1.

13. An optical system comprising:
   a plurality of reflecting optical elements, each of said reflecting optical elements being a reflecting optical element according to claim 1,
   wherein said plurality of the reflecting optical elements are combined together with their reflecting surfaces facing to each other.

14. An optical apparatus comprising a reflecting optical element according to claim 1.

15. An optical apparatus comprising an optical system according to claim 12.

16. An optical apparatus comprising an optical system according to claim 13.

17. A projection type image display apparatus comprising:
   a display element, said display element displaying an original image,
   a projection optical system, said projection optical system projecting said original image displayed on said display element to a screen,
   wherein said projection optical system includes said reflecting optical element according to claim 1.

18. A method for fabricating a reflecting optical element, comprising the steps of:
   integrally forming a resin layer having a surface comprising a plurality of curved surfaces discontinuous to each other on a continuous curved-surface portion of a base member, wherein the surfaces of said resin layer are formed using a mold partitioned to be allotted to respective curved surfaces; and
   forming reflecting films on said plurality of the curved surfaces of said resin layer,
   wherein said base member is formed of a material smaller in coefficient of linear expansion than the resin for forming said resin layer.

\* \* \* \* \*

UNITED STATES PATENT AND TRADEMARK OFFICE
CERTIFICATE OF CORRECTION

PATENT NO. : 6,848,794 B2
DATED : February 1, 2005
INVENTOR(S) : Toshihiro Sunaga It is certified that error appears in the above-identified patent and that said Letters Patent is hereby corrected as shown below:

<u>Title page,</u>
Insert Item:
-- [73] Assignee: Canon Kabushiki Kaisha, Tokyo, JP --.

Signed and Sealed this

Twentieth Day of December, 2005

JON W. DUDAS
*Director of the United States Patent and Trademark Office*